US011861595B2

(12) United States Patent
Vudathu et al.

(10) Patent No.: US 11,861,595 B2
(45) Date of Patent: Jan. 2, 2024

(54) SYSTEMS AND METHODS FOR GENERATION AND USE OF A DEVICE WALLET IDENTIFIER

(71) Applicant: JPMorgan Chase Bank, N.A., New York, NY (US)

(72) Inventors: Raghuram Vudathu, Downingtown, PA (US); Tuan Dao, Richardson, TX (US); Mervin Majella Felix, Newark, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 277 days.

(21) Appl. No.: 16/225,547

(22) Filed: Dec. 19, 2018

(65) Prior Publication Data
US 2020/0202331 A1     Jun. 25, 2020

(51) Int. Cl.
G06Q 20/36     (2012.01)
H04L 9/06      (2006.01)
H04L 9/08      (2006.01)
H04L 9/32      (2006.01)

(52) U.S. Cl.
CPC .................. *G06Q 20/3672* (2013.01)

(58) Field of Classification Search
CPC .............. G06Q 20/3672; G06Q 30/06; G06Q 30/0261; G06Q 20/322; G06Q 20/363; G06Q 20/3827; G06Q 20/227; G06F 16/9535; G06F 21/602; H04L 9/0643; H04L 9/0866; H04L 9/3297
See application file for complete search history.

(56) References Cited

U.S. PATENT DOCUMENTS

| | | | | |
|---|---|---|---|---|
| 5,768,526 A | * | 6/1998 | Fawcett | H04L 63/123 709/229 |
| 7,822,033 B1 | * | 10/2010 | Parker | H04L 29/12283 370/392 |
| 8,161,185 B2 | * | 4/2012 | Wells | H04L 45/00 709/238 |
| 8,984,276 B2 | * | 3/2015 | Benson | H04L 9/3226 713/155 |
| 9,092,447 B1 | * | 7/2015 | Anderson | G06Q 30/0185 |
| 9,195,984 B1 | * | 11/2015 | Spector | G06Q 20/367 |
| 9,760,702 B1 | * | 9/2017 | Kursun | G06F 21/34 |

(Continued)

OTHER PUBLICATIONS

IEEE 100 The Authority Dictionary of IEEE Standards Terms (7th Ed.) (Year: 2000).*

(Continued)

*Primary Examiner* — John W Hayes
*Assistant Examiner* — Edgar R. Martinez-Hernandez
(74) *Attorney, Agent, or Firm* — GREENBERG TRAURIG LLP

(57) ABSTRACT

Systems and methods for using a device wallet identifier are disclosed. In one embodiment, in an information processing apparatus comprising at least one computer processor, a method for generating a device wallet identifier may include: (1) receiving a wallet identifier for an electronic wallet or payment application executed by an electronic device; (2) retrieving an issuer identifier for a customer associated with the electronic wallet or payment application; (3) generating a device wallet identifier; and (4) storing a mapping of the device wallet identifier to the issuer identifier for the customer.

14 Claims, 5 Drawing Sheets

(56) References Cited

U.S. PATENT DOCUMENTS

| | | | |
|---|---|---|---|
| 2003/0226042 A1* | 12/2003 | Fukushima | G06Q 20/20 726/28 |
| 2005/0179544 A1* | 8/2005 | Sutton | G07C 9/00817 340/543 |
| 2006/0206709 A1* | 9/2006 | Labrou | G06Q 20/4014 713/167 |
| 2007/0169085 A1* | 7/2007 | Griep | G06F 11/0748 717/168 |
| 2008/0270532 A1* | 10/2008 | Billmaier | H04L 67/32 709/203 |
| 2010/0162115 A1* | 6/2010 | Ringewald | G11B 27/034 715/716 |
| 2011/0194462 A1* | 8/2011 | Wu | H04W 4/90 370/259 |
| 2012/0124658 A1* | 5/2012 | Brudnicki | G06Q 20/204 726/9 |
| 2013/0073859 A1* | 3/2013 | Carlson | G06Q 20/325 713/176 |
| 2014/0334498 A1* | 11/2014 | Anantharam | H04L 61/6022 370/401 |
| 2014/0379569 A1* | 12/2014 | Kang | G06Q 20/367 705/41 |
| 2015/0120472 A1 | 4/2015 | Aabye et al. | |
| 2015/0289025 A1* | 10/2015 | McLeod | H04N 21/2668 725/42 |
| 2018/0253705 A1 | 9/2018 | Spector et al. | |

OTHER PUBLICATIONS

Elmasri et al. Database Systems (7th Ed.) at p. 289 (Year: 2016).*
Molina et al. Database Systems The Complete Book (Year: 2009).*
Steven M. Kaplan, Wiley Electrical & Electronics Engineering Dictionary 605 (2004) (Year: 2004).*
Menezes, HandBook of Applied Cryptography (Year: 1965).*
International Search Report and Written Opinion of the International Searching Authority, dated Mar. 31, 2020, from corresponding International Application No. PCT/US2019/067243.

* cited by examiner

| ID_PREFIX(S) | TAKEN |
|---|---|
| 00000 | Y |
| 00001 | Y |
| ... | ... |
| 99998 | N |
| 99999 | N |

FIGURE 3A

| ID_SUFFIX(S) | TAKEN |
|---|---|
| 654057458 | Y |
| 376774839 | Y |
| ... | ... |
| 543837489 | N |
| 093472809 | N |

FIGURE 3B

| Device ID | Device Valuation (Linen Sheet) |
|---|---|
| 0000000460 7.65 | e3bc44298fc11149af844899 6f892427ae41e4649b934ca4 9591b7852b855 |
| 0000037677 48.59 | 38b060a751ac96384cd9327e b1b1e36a21fdb71114be0743 4c0cc7bf63f6e1da |
| ... | ... |
| 0000003748 9 | cf83e1357efb8bdf1542850d 66d8007d620e4050b57135dc8 3fa921d36ce9ce4 |
| 0000017448 9 | 6ed0d0280fa89e25de060c 19d3ac80cabb87d6a0dd05c 333b8444 |

FIGURE 3C

SYSTEMS AND METHODS FOR GENERATION AND USE OF A DEVICE WALLET IDENTIFIER

BACKGROUND OF THE INVENTION

1. Field of the Invention

The present invention generally relates to systems and methods for generation and use of a device wallet identifier.

2. Description of the Related Art

Electronic or digital wallets often have a number of identifiers—for example, a hardware identifier, an operating system-generated identifier, a platform identifier, etc. These identifiers may also be based on the underlying device, or from the wallet provider. The number of different identifiers often causes fragmentation and increases the complexity for an issuer to identify wallet providers and device-specific wallets in a uniform manner.

SUMMARY OF THE INVENTION

Systems and methods for using a device wallet identifier are disclosed. In one embodiment, in an information processing apparatus comprising at least one computer processor, a method for generating a device wallet identifier may include: (1) receiving a wallet identifier for an electronic wallet or payment application executed by an electronic device; (2) retrieving an issuer identifier for a customer associated with the electronic wallet or payment application; (3) generating a device wallet identifier; and (4) storing a mapping of the device wallet identifier to the issuer identifier for the customer.

In one embodiment, the wallet identifier may include at least one of a hardware identifier, an operating system-generated identifier, and a platform-generated identifier.

In one embodiment, the step of generating a device wallet identifier may include: selecting a first number from a plurality of prefixes; selecting a second number from a plurality of suffixes; creating a combined number by appending the first number to the second number; and executing a device hash function on the combined number.

In one embodiment, the combined number may also include the wallet identifier and/or the issuer identifier.

In one embodiment, the method may further include removing the first number from the plurality of prefixes, and removing the second number from the plurality of suffixes.

In one embodiment, the device wallet identifier may also include a timestamp.

In one embodiment, the device wallet identifier may not be reversible or replicable.

According to another embodiment, a system for generating a device wallet identifier may include an electronic device executing an electronic wallet or payment application and a backend comprising at least one computer processor. The backend may receive a wallet identifier for the electronic wallet or payment application from the electronic device; may retrieve an issuer identifier for a customer associated with the electronic wallet or payment application; may generate a device wallet identifier; and may store a mapping of the device wallet identifier to the issuer identifier for the customer.

In one embodiment, the wallet identifier may include at least one of a hardware identifier, an operating system-generated identifier, and a platform-generated identifier.

In one embodiment, the backend may generate the device wallet identifier by: selecting a first number from a plurality of prefixes; selecting a second number from a plurality of suffixes; creating a combined number by appending the first number to the second number; and executing a device hash function on the combined number.

In one embodiment, the combined number may also include the wallet identifier and/or the issuer identifier.

In one embodiment, the backend may also remove the first number from the plurality of prefixes, and remove the second number from the plurality of suffixes.

In one embodiment, the device wallet identifier may also include a timestamp.

In one embodiment, the device wallet identifier may not be reversible or replicable.

BRIEF DESCRIPTION OF THE DRAWINGS

For a more complete understanding of the present invention, the objects and advantages thereof, reference is now made to the following descriptions taken in connection with the accompanying drawings in which:

FIG. 3A depicts an exemplary first table of sequential numbers according to one embodiment;

FIG. 3B depicts an exemplary second table of random numbers according to one embodiment;

FIG. 3C depicts an exemplary table of the Device Wallet IDs according to one embodiment;

DETAILED DESCRIPTION OF PREFERRED EMBODIMENTS

Embodiments disclosed herein are directed to systems and methods for generation and use of a device wallet identifier.

Embodiments disclosed herein may create a onetime mapping of the hardware identifier, operating system-generated identifier, and/or platform-generated identifier to a device wallet identifier, which may be called "DeviceWalletId." The device wallet identifier may be a unique alpha-numeric string that may not be reversible and/or replicable.

The device wallet identifier may be generated using a combination of an issuer identifier (e.g., something that uniquely identifies the customer/user on the issuer side, such as a person identifier, customer identifier, profile identifier, etc.) and/or a hardware identifier, which may be passed to an algorithmic function and mapped, by the issuer, to the issuer identifier.

Embodiments may provide some or all of the following advantages: (1) unified handling of permutation of the hardware identifier, operating system-generated identifier, and/or platform-generated identifier and the issuer identifier; (2) provides an immutable identifier that survives events involving the wallet or device (e.g., resets, uninstalls, operating system resets, etc.), thereby "hack-proofing" the hardware identifier if the device is compromised (e.g., jail broken); (3) the issuer may maintain a device history that may be used for fraud detection, decisioning, etc.; (4) allows multiple people using the same device (e.g., the same hardware identifier, operating system-generated identifier, and/or platform-generated identifier) to have different device wallet identifiers based on different issuer identifiers;

(5) permits promotions, communications, offers, etc. to be sent to the customer based on usage and/or usage patterns; etc.

Figure 1:
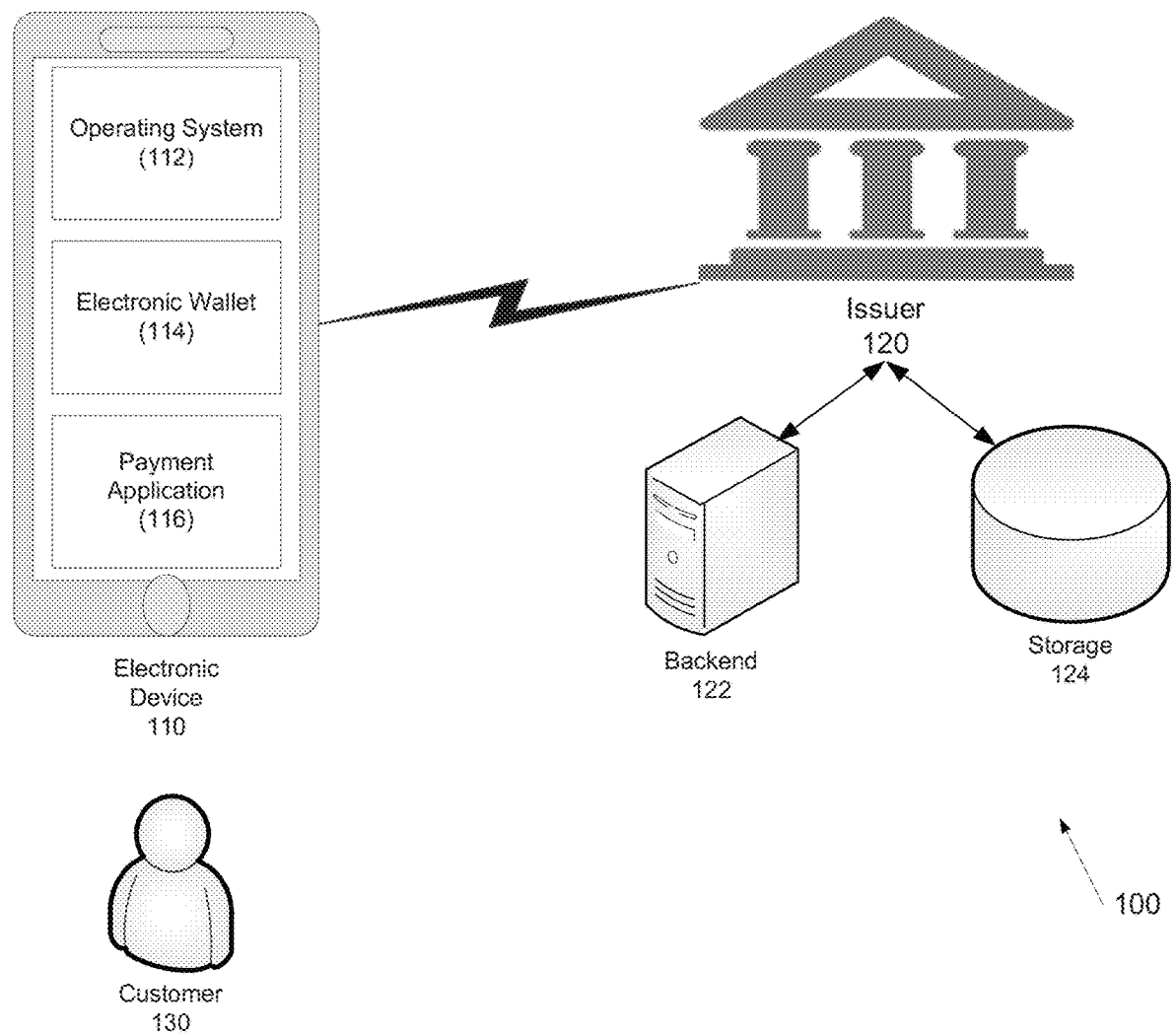
FIG. 1 depicts a system for generation and use of a device wallet identifier according to one embodiment.

Referring to FIG. 1, a system for generation and use of a device wallet identifier is disclosed according to one embodiment. System 100 may include electronic device 110, which may be any suitable electronic device (e.g., smartphone, tablet computer, smart watch, Internet of Things (IoT) appliance, notebook/laptop computer, desktop computer, workstation, etc.). Electronic device 110 may execute operating system 112, and may execute one or more electronic wallets 114, one or more payment application 116, etc.

Electronic device 110 may provide one or more of a hardware identifier (e.g., a manufacturer defined or assigned identifier), operating system-generated identifier, and/or platform-generated identifier for electronic wallet(s) 114 and/or payment application(s) 116.

System 100 may further include issuer 120, which may issue one or more financial instruments that may be provisioned to electronic wallet(s) 114 and/or payment application(s) 114. Issuer 120 may include backend 122, which may include one or more servers, computers, etc. that may generate a device wallet identifier.

Issuer 120 may also assign an issuer identifier (e.g., something that uniquely identifies the customer on the issuer side, such as a person identifier, customer identifier, profile identifier, etc.) to customer 130.

Storage 124 may maintain a mapping between the issuer identifier and the device wallet identifier.

In one embodiment, the device wallet identifier may be stored on electronic device 110, for example, in secure storage, within a cache for electronic wallet 114 and/or payment application, etc. In one embodiment, the device wallet identifier may be sent as part of a request or API call from electronic device 110 to issuer backend 122.

Figure 2:
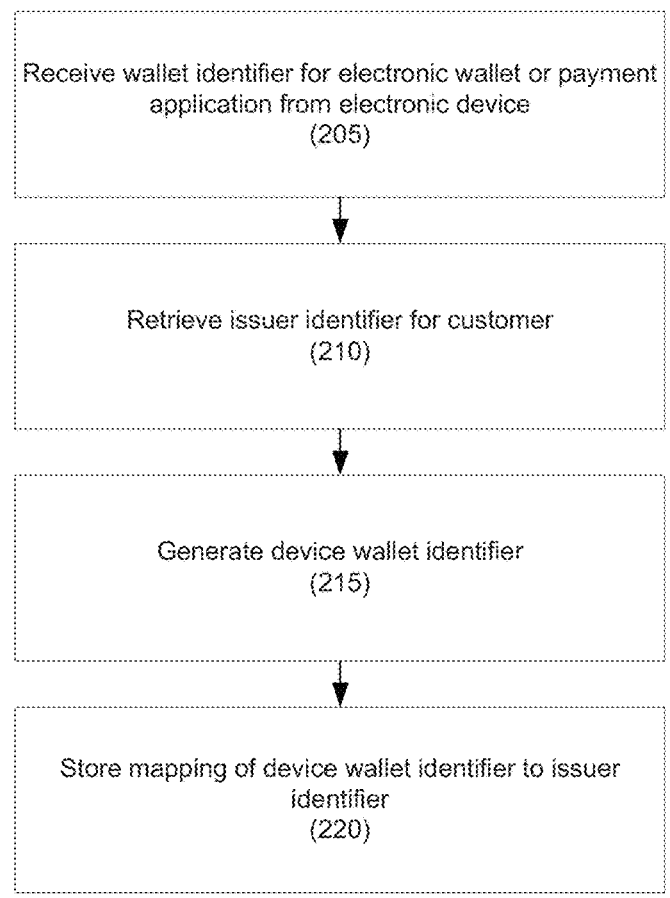
FIG. 2 depicts an method for generating a device wallet identifier according to one embodiment.

Referring to FIG. 2, a method for generating a device wallet identifier is disclosed according to one embodiment.

In step 205, a backend for an issuer may receive a payload including, for example, a wallet identifier that may include one or more of a hardware identifier, operating system-generated identifier, and/or platform-generated identifier for an electronic wallet or payment application executed by an electronic device. In one embodiment, this may occur when a financial instrument is provisioned to the wallet, during a lifecycle event, etc.

In one embodiment, at least some of the payload may be encrypted.

In another embodiment, at least some of the payload may be received from a payment network (e.g., Visa, MasterCard, etc.) during provisioning. In one embodiment, a reconciliation algorithm may be used to calculate a device wallet identifier.

In step 210, the backend may retrieve an issuer identifier for the customer. In one embodiment, the issuer identifier may be anything that uniquely identifies the customer on the issuer side, such as a person identifier, customer identifier, profile identifier, etc.

In step 215, the backend may generate a device wallet identifier. In one embodiment, the device wallet identifier may be based on the wallet identifier (e.g., the hardware identifier, operating system-generated identifier, and/or platform-generated identifier) and the issuer identifier using an algorithmic function. In one embodiment, the device wallet identifier that be a unique alphanumeric string that may not be reversible and/or replicable.

In one embodiment, the device wallet identifier may be unique to the customer, even if the customers are using the same device.

In another embodiment, the device wallet identifier may be randomly generated. For example, a first table of sequential numbers having a fixed length may be used. For example, the first table may have four digits. Any suitable number of digits may be used as is necessary and/or desired.

In one embodiment, the first table may lists the number of identifier batches intended to be used by an application.

An example of a first table is provided in FIG. 3A.

A second table of random numbers having a fixed length that may be left padded with zeros may be used. In one embodiment, a table having six digits may be used. Any suitable number of digits may be used as is necessary and/or desired.

In one embodiment, the second table may be is an estimate of the quantity of identifiers allocated in a given batch.

An example of a second table is provided in FIG. 3B.

Figure 4:
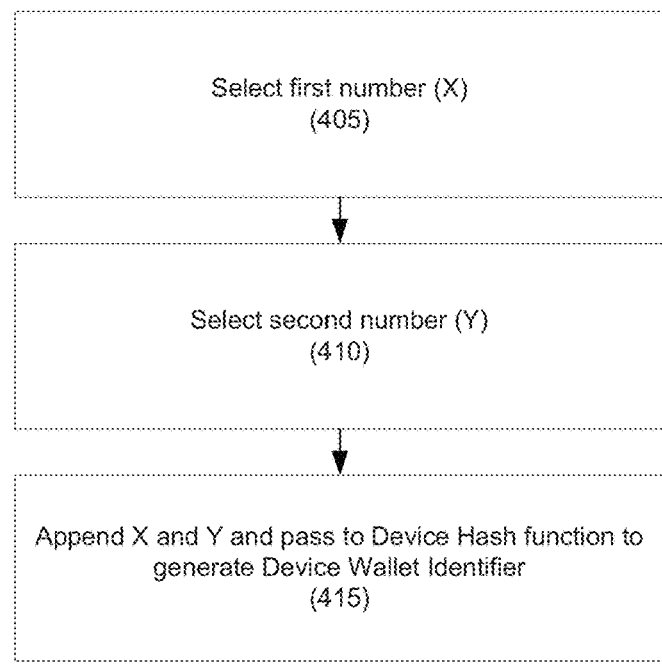
FIG. 4 depicts a method of deriving a Device Wallet ID is disclosed according to one embodiment.

Next, a hash of the device identifier may be generated using the first and second tables. Referring to FIG. 4, a method of deriving a Device Wallet ID is disclosed according to one embodiment.

In step 405, a number, X, may be selected. In one embodiment, this may be an available ID_PREFIX value from the first table (e.g., the DEVICE_ID_PREFIX table). The selected ID_PREFIX may be marked as unavailable. In one embodiment, the number X may be randomly or pseudo-randomly selected.

In step 410, a second number, Y, may be selected. In one embodiment, an available ID_SUFFIX value from the second table (e.g., the DEVICE_ID_SUFFIX table) may be selected and may be marked as unavailable. In one embodiment, the number Y may be randomly or pseudo-randomly selected.

In step 415, the two values (X and Y) may be appended and passed as a parameter into a Device Hash algorithm. In one embodiment, additional parameter(s), such as such as a person identifier, a customer identifier, a profile identifier, a hardware identifier, etc. may be appended with the two values as is necessary and/or desired.

In one embodiment, a system time stamp (e.g., in milliseconds) may be appended and passed to the Device Hash function.

The derived value is the DeviceWalletID. For example, an equation representing the DeviceWalletID is $$\text{DeviceWalletID} = \text{DeviceHashAlgorithm}(\text{``}X\text{''} + \text{``}Y\text{''}, \text{``ProfileID''}).$$

An example table depicting DEVICE_HASH (e.g., the Device Wallet ID) is provided as FIG. 3C.

In step 220, the device wallet identifier may be mapped to the issuer identifier for the customer, and may be stored in a database. In one embodiment, the device wallet identifier may also be calculated at runtime.

Exemplary use cases for the device wallet identifier are as follows. First, the device wallet identifier may be used to send special offers based on customers' usage pattern to encourage people to use the wallet or payment application. For example, customers may be provided with incentives to encourage continued use (e.g., "super users" that frequently use the wallet or payment application), to encourage continued use (e.g., casual users that use the application occasionally), or to encourage users to try the wallet or payment application (e.g., first time users).

As another example, the device wallet identifier may be used to profile a customer's behavior using the wallet or payment application on the electronic device. For example, a profile may be generated based on the type of transactions, number of transactions, transaction amount, etc. conducted by the customer using the wallet or payment application on the electronic device. A separate profile may be kept for each wallet or payment application on each of the customer's electronic devices.

As another example, the device wallet identifier may be used to provide analytics for customers. For example, the customer may be provided with the customer's behavior pattern using each of the customer's wallets payment applications on each of the customer's electronic devices.

As another example, the device wallet identifier may be used with a fraud rules engine to approve/reject the transactions based on the geographic coordinates of the electronic device and the device wallet identifier, to calculate a risk score based on the type of transactions/payment activities on the electronic device, etc.

In one embodiment, the device wallet identifier may be used to send targeted marketing messages, notifications, personalized messages, etc. to the customer through the wallet or payment application, out of band, etc.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for generating a device wallet identifier that survives events involving an electronic wallet or an electronic device that executes the electronic wallet, comprising:

receiving, at a backend for a financial institution, a wallet identifier for an electronic wallet or payment application executed by the electronic device from the electronic wallet or payment application;

retrieving, by the backend, an issuer identifier for a customer associated with the electronic wallet or payment application; and generating, by the backend, a device wallet identifier by:
selecting, by the backend, a first number from a plurality of prefixes in a first table and a second number from a plurality of suffixes in a second table, wherein the plurality of prefixes in the first table comprise a plurality of sequential numbers, and the plurality of suffixes in the second table comprises a plurality of random numbers;
marking, by the backend, the first number as unavailable in the first table;
marking, by the backend, the second number as unavailable in the second table;
executing, by the backend, a device hash function on the first number, the second number, and the wallet identifier resulting in the device wallet identifier, wherein the device wallet identifier is not reversible; and
storing, by the backend and in a table, a mapping of the device wallet identifier to the issuer identifier for the customer.

2. The method of claim 1, wherein the wallet identifier comprises at least one of a hardware identifier, an operating system-generated identifier, and a platform-generated identifier.

3. The method of claim 1, further comprising:
removing, by the backend, the first number from the plurality of prefixes; and
removing, by the backend, the second number from the plurality of suffixes.

4. The method of claim 1, wherein the device wallet identifier further comprises a timestamp.

5. The method of claim 1, wherein the plurality of prefixes in the first table have a first fixed length, and the plurality of suffixes in the second table have a second fixed length.

6. A system for generating a device wallet identifier that survives events involving an electronic wallet or an electronic device that executes the electronic wallet, comprising:
the electronic device executing an electronic wallet or payment application; and
a backend comprising at least one computer processor; wherein:
the backend is configured to receive a wallet identifier for the electronic wallet or payment application from the electronic device;
the backend is configured to retrieve an issuer identifier for a customer associated with the electronic wallet or payment application; and
the backend is configured to generate a device wallet identifier by:
selecting a first number from a plurality of prefixes in a first table and a second number from a plurality of suffixes in a second table, wherein the plurality of prefixes in the first table comprise a plurality of sequential numbers, and the plurality of suffixes in the second table comprises a plurality of random numbers;
marking the first number as unavailable in the first table;
marking the second number as unavailable in the second table;
executing a device hash function on the first number, the second number, and the wallet identifier resulting in the device wallet identifier, wherein the device wallet identifier is not reversible; and
the backend is configured to store a mapping of the device wallet identifier to the issuer identifier for the customer in a table.

7. The system of claim 6, wherein the wallet identifier comprises at least one of a hardware identifier, an operating system-generated identifier, and a platform-generated identifier.

8. The system of claim 6, wherein the device wallet identifier further comprises a timestamp.

9. The system of claim 6, wherein the plurality of prefixes in the first table have a first fixed length, and the plurality of suffixes in the second table have a second fixed length.

10. An electronic device, comprising:
a processor; and
a memory storing instructions that when executed by the processor causes the processor to perform the operations of:
receive a wallet identifier for an electronic wallet or payment application executed by a mobile electronic device from the electronic wallet or payment application;
retrieve an issuer identifier for a customer associated with the electronic wallet or payment application; and
generate a device wallet identifier that survives events involving an electronic wallet or the electronic device that executes the electronic wallet by:
selecting a first number from a plurality of prefixes in a first table and a second number from a plurality of suffixes in a second table, wherein the plurality of prefixes in the first table comprise a plurality of sequential numbers, and the plurality of suffixes in the second table comprises a plurality of random numbers;
marking the first number as unavailable in the first table;
marking the second number as unavailable in the second table;
executing a device hash function on the first number, the second number, and the wallet identifier resulting in the device wallet identifier, wherein the device wallet identifier is not reversible; and
storing a mapping of the device wallet identifier to the issuer identifier for the customer in a table.

11. The electronic device of claim 10, wherein the wallet identifier comprises at least one of a hardware identifier, an operating system-generated identifier, and a platform-generated identifier.

12. The electronic device of claim 10, wherein the operations further comprise remove the first number from the plurality of prefixes; and remove the second number from the plurality of suffixes.

13. The electronic device of claim 10, wherein the device wallet identifier further comprises a timestamp.

14. The electronic device of claim 10, wherein the plurality of prefixes in the first table have a first fixed length, and the plurality of suffixes in the second table have a second fixed length.

* * * * *